United States Patent [19]

Johnson et al.

[11] Patent Number: 4,476,954
[45] Date of Patent: Oct. 16, 1984

[54] REMOTE CONTROL FOR MOTOR VEHICLE

[75] Inventors: Dale R. Johnson, Boulder; John A. Ciciora, Denver, both of Colo.

[73] Assignee: Johnson Engineering Corporation, Boulder, Colo.

[21] Appl. No.: 421,599

[22] Filed: Sep. 22, 1982

[51] Int. Cl.$^3$ .............................................. B60K 31/00
[52] U.S. Cl. ................................. 180/333; 74/471 R; 74/471 XY; 123/352; 180/65.1; 180/65.8; 180/170; 180/178; 318/628; 318/663; 364/424; 364/426
[58] Field of Search ............... 180/333, 315, 179, 169, 180/168, 165, 79.1, DIG. 3, 170, 174, 178, 334, 65.1, 65.2, 65.3, 65.4, 65.5, 65.6, 65.7, 65.8; 74/471 R, 471 XY, 491; 364/424, 426; 123/352; 318/17, 887, 628, 663

[56] References Cited

U.S. PATENT DOCUMENTS

| | | | |
|---|---|---|---|
| 3,022,850 | 2/1962 | Bidwell et al. | 180/333 |
| 3,814,199 | 6/1974 | Jones | 180/333 X |
| 3,983,954 | 10/1976 | Noddings et al. | 364/426 X |
| 4,059,786 | 11/1977 | Jones et al. | 180/907 |
| 4,072,206 | 2/1978 | Larson et al. | 364/426 X |
| 4,133,406 | 1/1979 | Allerdist | 364/426 X |

FOREIGN PATENT DOCUMENTS 2522639 12/1975 Fed. Rep. of Germany ..... 180/65.8

Primary Examiner—Joseph F. Peters, Jr.
Assistant Examiner—Mitchell J. Hill
Attorney, Agent, or Firm—O'Rourke & Harris

[57] ABSTRACT

A remote controller is disclosed for controlling the throttle, brake and steering mechanism of a conventional motor vehicle, with the remote controller being particularly advantageous for use by severely handicapped individuals. The controller includes a remote manipulator which controls a plurality of actuators through interfacing electronics. The remote manipulator is a two-axis joystick which controls a pair of linear actuators and a rotary actuator, with the actuators being powered by electric motors to effect throttle, brake and steering control of a motor vehicle adapted to include the controller. The controller enables the driver to control the adapted vehicle from anywhere in the vehicle with one hand with minimal control force and range of motion. In addition, even though a conventional vehicle is adapted for use with the remote controller, the vehicle may still be operated in the normal manner.

17 Claims, 11 Drawing Figures

Fig_1

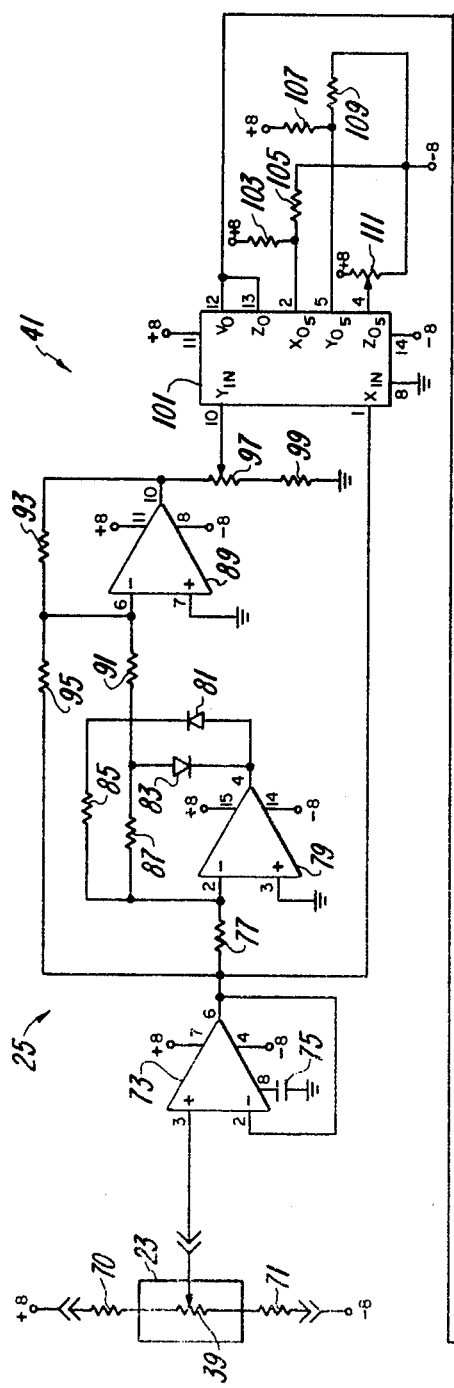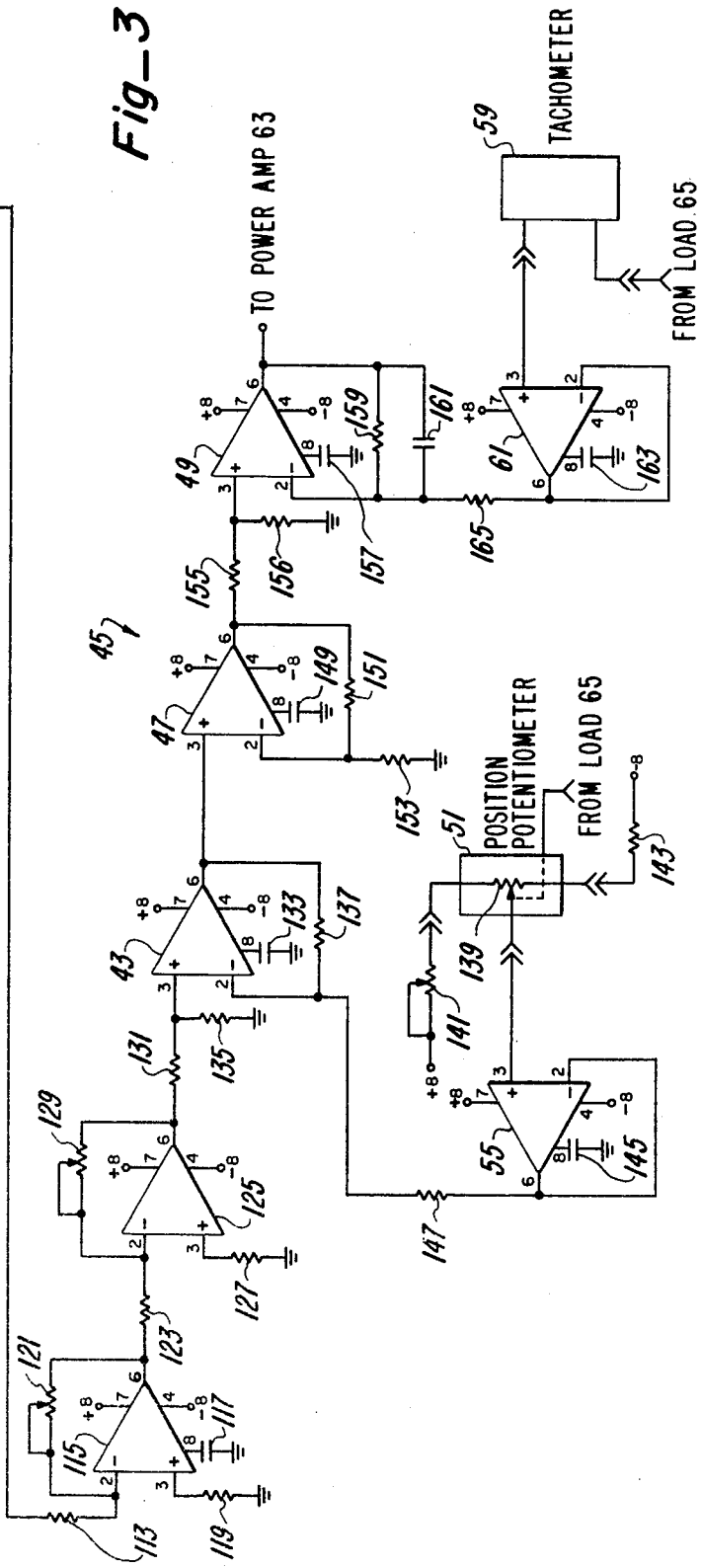
Fig_3

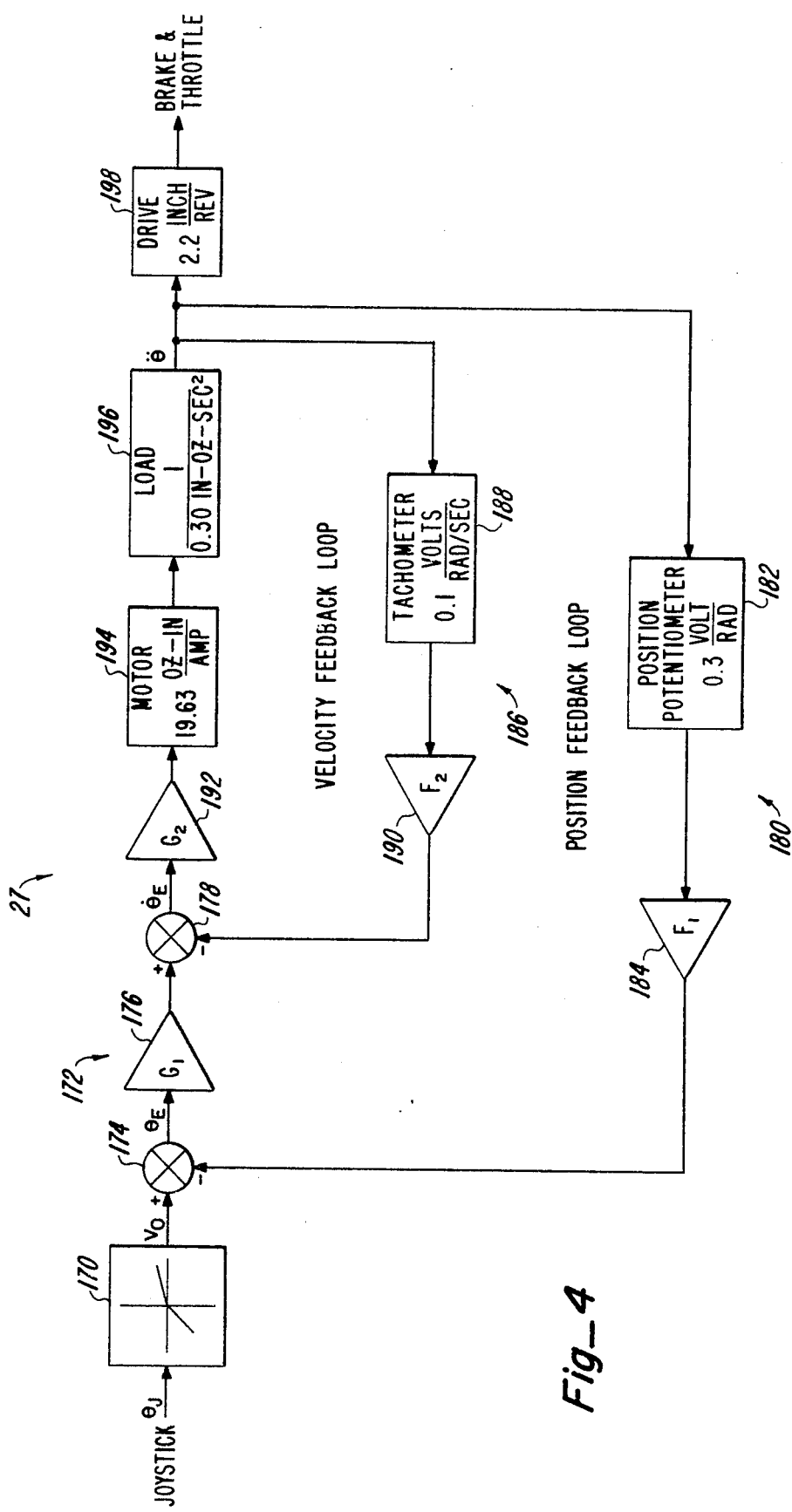
Fig_4

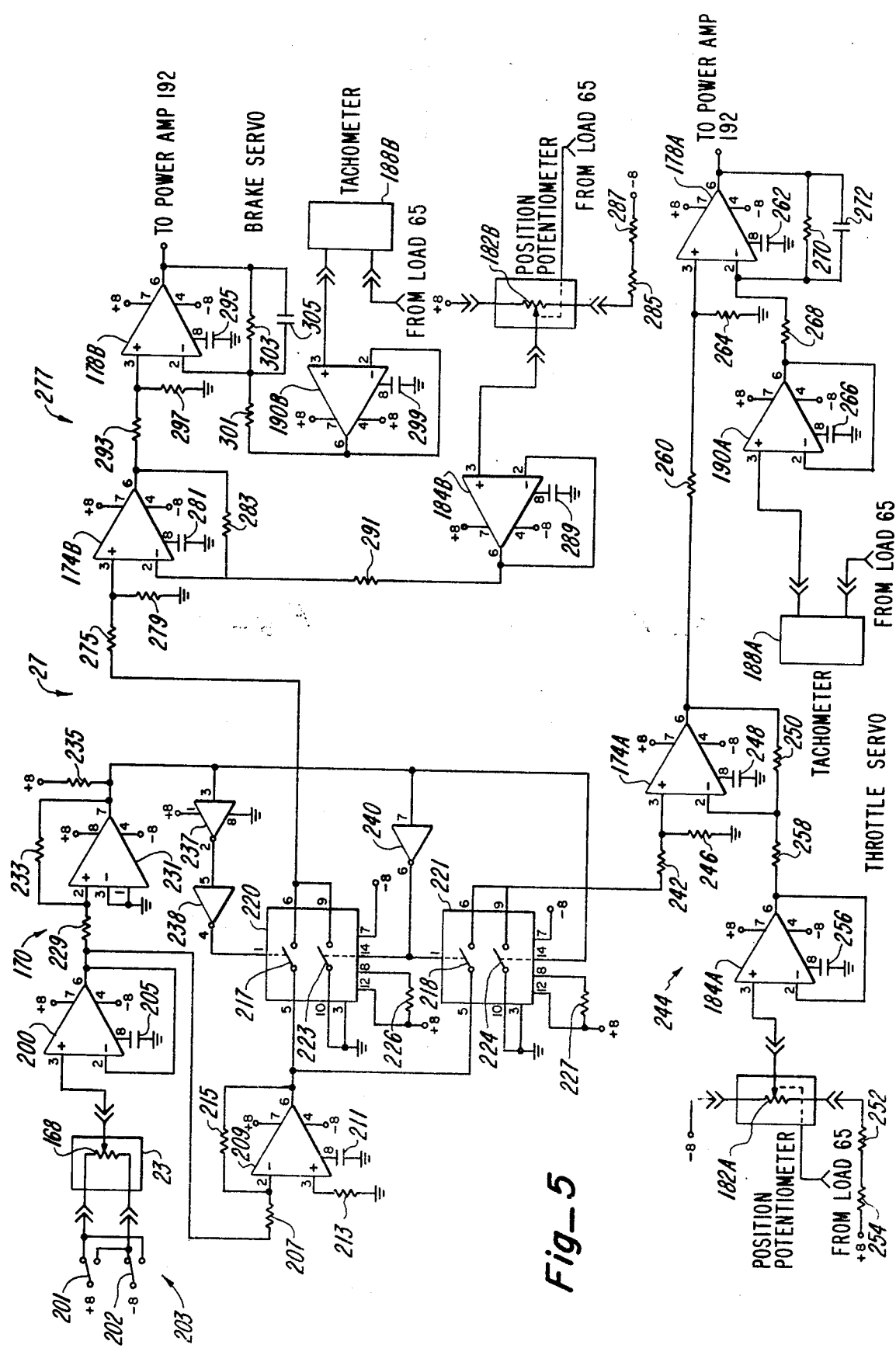
Fig_5

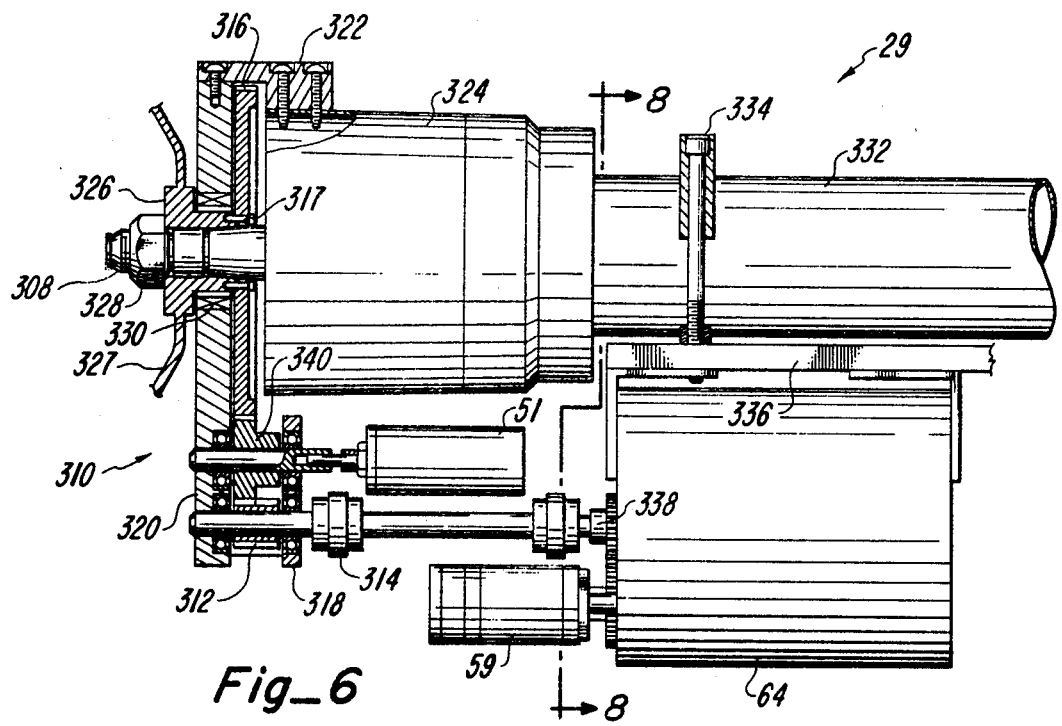
Fig_6
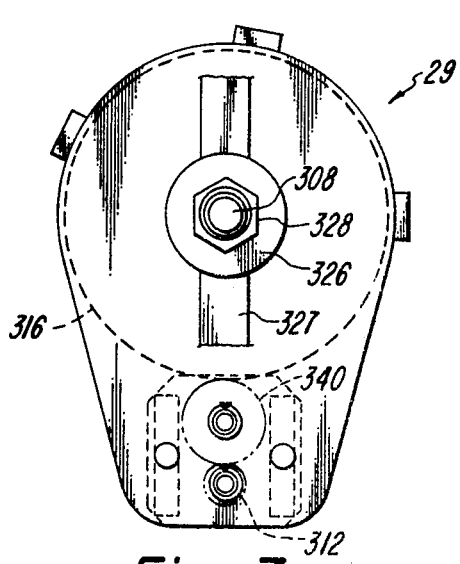
Fig_7
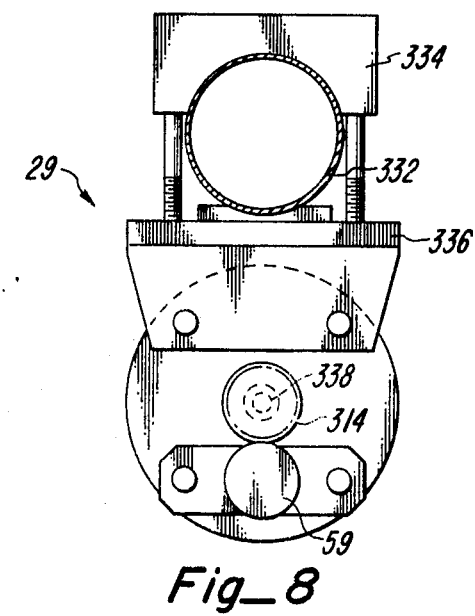
Fig_8

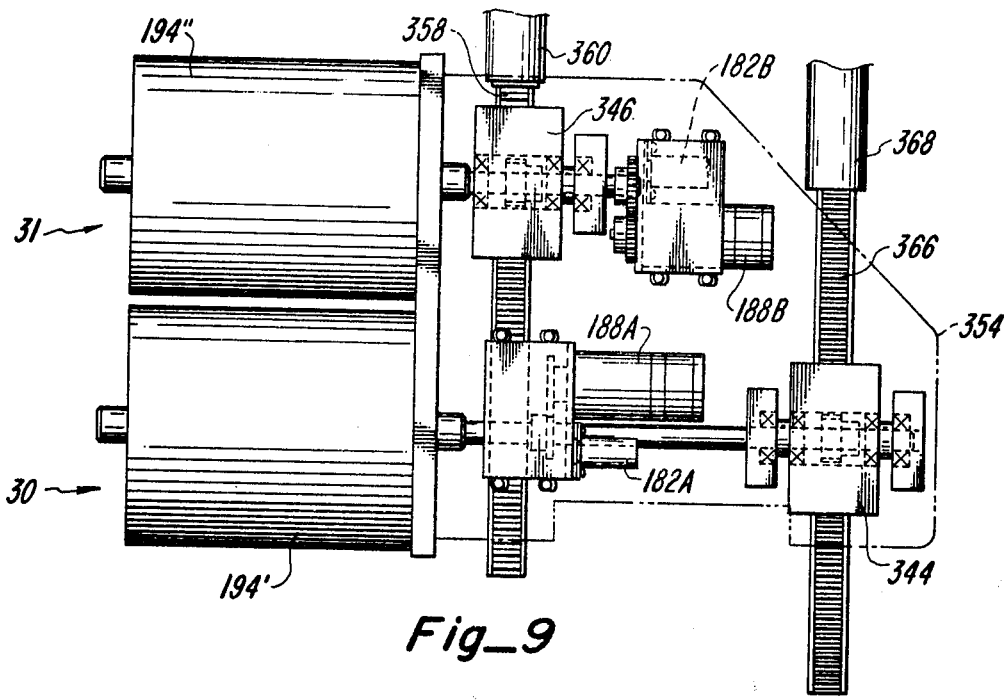
Fig_9
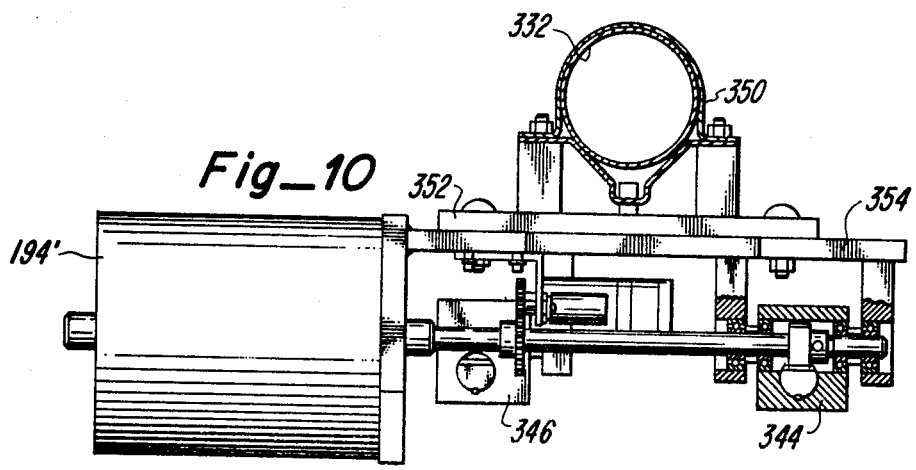
Fig_10
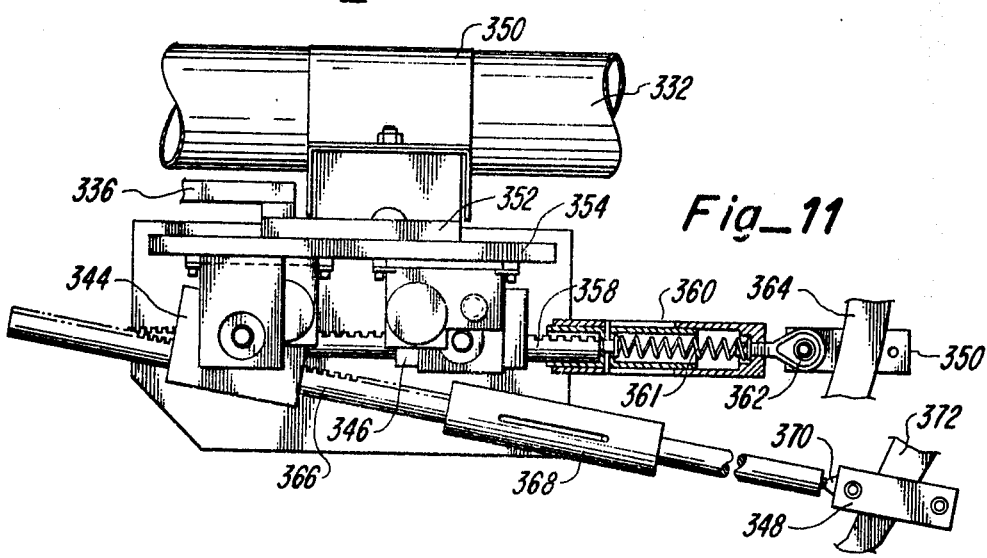
Fig_11

REMOTE CONTROL FOR MOTOR VEHICLE

GOVERNMENT RIGHTS

This invention was made with Government support under NASA Contract NAS 9-16189 awarded by NASA. The Government has certain rights in this invention.

FIELD OF THE INVENTION

This invention relates to a motor vehicle controller, and, more particularly, to a remote controller for a motor vehicle.

BACKGROUND OF THE INVENTION

Vehicle controls have been developed and refined over a period of years to fulfill a variety of needs. With respect to a motor vehicle such as the automobile, it is essential that the direction and speed of movement be controlled. As is well known, the direction of an automobile is now normally controlled by a rotatable steering wheel, and speed is normally controlled by foot pedals which include an accelerator (throttle) for increasing (or maintaining) the speed of the vehicle and a brake for decreasing the speed (or stopping) the vehicle, with the steering wheel, accelerator and brake being normally positioned inside the passenger compartment so as to be readily available to the driver.

While the normal mode of control for a motor vehicle, such as an automobile, has been satisfactory for most individuals, improvements are still felt to be warranted, and some handicapped individuals have not been able to control a motor vehicle using the now normally accepted control system. With respect to handicapped individuals, efforts have heretofore been made to develop different control systems for a vehicle that would enable certain handicapped individuals to control such a vehicle.

Such efforts have included, for example, a modified control system using mechanical controls to enable paraplegics who have lost the use of their lower extremities to manipulate the throttle and brake by hand with no change in steering (since the steering wheel is now normally rotated by hand).

A simple hand-operated "T" handle has also been developed for use by handicapped individuals still capable of rotating a conventional steering wheel, with the "T" handle controlling the throttle and brake through the use of pneumatic servos.

An adaptive control system for a vehicle has also been heretofore developed for use by certain quadriplegics capable of limited arm motion. In at least one such system, a steering wheel of reduced size has been used in conjunction with a pivotable pedestal having the steering wheel mounted thereon so that pivoting movement of the pedestal in on direction (usually by pushing the pedestal forward) causes the vehicle to be accelerated and pivoting movement in the opposite direction causes the brake to be applied. For higher level quadriplegics unable to exert the arm motion necessary for rotation of the steering wheel, a modification has also been heretofore developed which replaces the steering wheel with a tri-pin grip.

Still another control system has been heretofore developed for use by high level quadriplegics which utilizes a small joystick to control the three primary vehicle control functions (i.e., throttle, brake and steering) with the system depending upon utilization of hydraulic servos involving a large and complex array of pumps and valves.

The control system utilized for the lunar rover (Apollo moon missions) allowed the operating astronaut to control acceleration, braking and steering with one hand through the use of a rather complicated hand controller having potentiometers mounted therein to sense the position of the controller and drive wheel connected electric motors to effect propulsion and steering of the vehicle.

While heretofore known and/or utilized modified control systems have allowed some handicapped individuals to operate a motor vehicle, such systems have not proved to be completely successful, at least for use by some handicapped individuals, since some high level quadriplegics (C-5 for example) are not able to exert even the limited arm motions necessary to operate such modified control systems. In addition, some such heretofore known and/or utilized control systems have required complex modifications which have made installation difficult and/or increased maintenance requirements, have made removal and application to other vehicles difficult if not impossible from a practical standpoint, have made controls more difficult even to the point of being unsafe at least at high speeds, and/or have required major alterations of the vehicle control system such that it was impossible to operate the vehicle in the normal mode after the vehicle has been adapted for use with the modified controlled system.

SUMMARY OF THE INVENTION

This invention provides an improved control system for a motor vehicle with the control system being particularly useful in allowing control to be effected with little arm movement with the control system being therefore particularly well suited for use by handicapped individuals such as high level quadriplegics. The control system includes a remote controller having a two-axis joystick, actuators for effecting direction and speed control, and electronic interfacing between the joystick and actuators. The control system is operable with one-hand, is relatively simple in structure and yet is dependable in operation, is remotely situated with capability of operation anywhere in the vehicle, and does not prevent normal operation of the adapted vehicle.

It is therefore an object of this invention to provide an improved control system for a motor vehicle.

It is still another object of this invention to provide an improved control system for a motor vehicle that is relatively simple in structure and yet is dependable in operation.

It is yet another object of this invention to provide an improved control system for a motor vehicle that is remotely situated and capable of operation anywhere in the vehicle.

It is another object of this invention to provide an improved control system for a motor vehicle suitable for use by handicapped individuals such as high level quadriplegics.

It is still another object of this invention to provide an improved control system for a motor vehicle that does not prevent normal operation of the adapted vehicle.

It is yet another object of this invention to provide an improved control system for a motor vehicle that can be relatively easily installed almost entirely within the passenger compartment of the motor vehicle.

It is another object of this invention to provide an improved control system for a motor vehicle that requires no extensive reach to fatigue the arms and shoulders of a driver.

It is still another object of this invention to provide an improved control system for a motor vehicle that can be easily modified to a configuration best suited for a particular handicapped driver.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 3 is a schematic diagram of steering control electronics shown in block form in FIG. 2;

FIG. 4 is a dynamic block diagram of the throttle and braking electronics utilized in the control system shown in FIG. 1;

FIG. 5 is a schematic diagram for throttle and braking electronics shown in block form in FIG. 4;

FIG. 6 is a side view illustrating modification of a conventional steering system to adapt the motor vehicle for use with the control system shown in FIG. 1;

FIG. 7 is a front view of the modified steering system as shown in FIG. 6;

FIG. 8 is a cross sectional view taken through lines 8—8 of FIG. 6;

FIG. 9 is a front view illustrating modification of a conventional motor vehicle for throttle and brake control as a part of the control system shown in FIG. 1;

FIG. 10 is a top view of the modified throttle and brake control system as shown in FIG. 9; and FIG. 11 is a side view of the modified throttle and brake control system shown in FIGS. 9 and 10.

DESCRIPTION OF THE INVENTION

The act of normal driving of an automobile involves an operator acting across an interface to control the vehicle. This is a complex, semi-skilled, neuromuscular function, involving visual, auditory and vestibular sensation, processing of information, and execution of commands to modulate vehicle velocity and direction.

The control interface of an automobile has been designed to accommodate the capabilities and limitations of a driver without appreciable handicaps that would prevent normal use of arms and legs. Early in automotive history, the standard operator controls became foot pedals for speed control and a hand wheel for direction control (as well as a clutch pedal if automatic transmission is not included in the vehicle). Even today, despite dimensional variations, standard automobiles in common usage have a steering wheel mounted on a column with spaced accelerator and brake pedals at the base of, and somewhat offset with respect to, the steering column.

In the case of a handicapped driver, some device must therefore be introduced to either augment the output capabilities of the driver or to modifiy the input requirements of the vehicle, depending upon the handicap of the driver. Due to the physical limitations often present in severely handicapped cases, special considerations in overcoming man-machine interface problems were required in providing the control system of this invention. Among such considerations was that only minimal operator control input force and range of motion of one hand would be available for use, and that such minimal force and motion would have to be utilized to develop sufficient force to control a throttle, brake and steering functions in the adapted motor vehicle.

Figure 1:
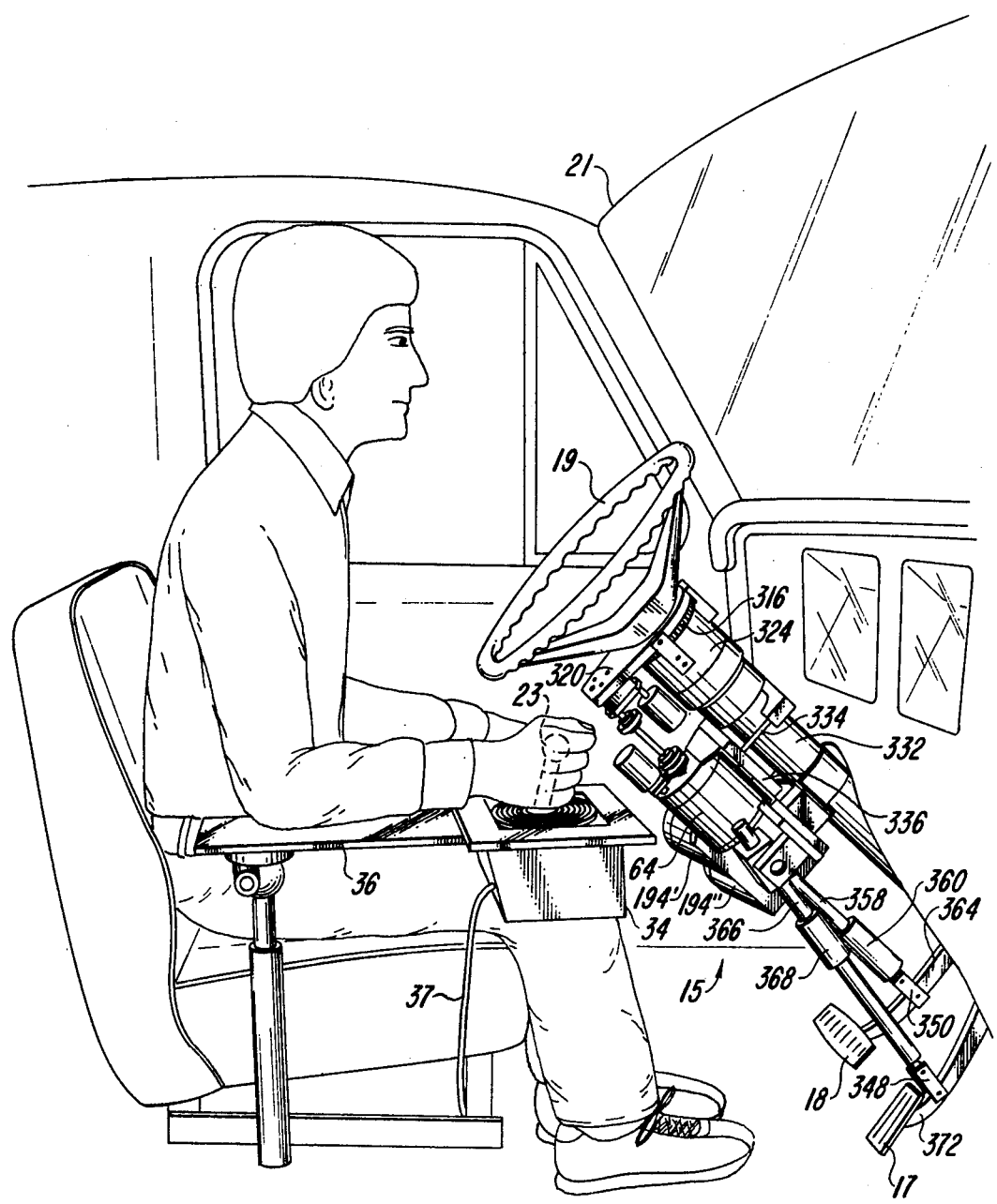
FIG. 1 is a perspective presentation illustrating positioning and typical use of the control system of this invention in an adapted motor vehicle.

As indicated in FIG. 1, control system 15 is a remote manipulator capable of accurately positioning the throttle pedal 17, brake pedal 18, and steering wheel 19 of a conventional motor vehicle 21 (which can be a conventional automobile or van, for example, having an automatic transmission) in response to input commands executed by the driver. The entire control system is designed to be installed in the passenger compartment of the standard, or conventional motor vehicle (rather than in the harsh environment that exists in the engine compartment or under the vehicle), and includes a driver's control input device 23 (shown in mechanical form in FIG. 1 and referenced in the steering and throttle/brake block and schematic diagrams of FIGS. 2 through 5), interfacing electronics (generally designated by the numeral 25 for steering and 27 for throttle/brake as shown in the block and schematic diagrams of FIGS. 2 through 5), and a plurality of actuating assemblies generally designated by the numerals 29 (for steering), 30 (for throttle), and 31 (for brake), which actuating assemblies (as best shown in FIGS. 6 through 11) exert control over the vehicle.

The design of the driver's control input device 23 and its associated hardware evolved from a human factors analysis of the control capabilities and limitations of quadriplegics who have suffered lesions of the spinal cord at the fifth cervical vertebra (C-5). Persons who have suffered such a severe injury have very limited use of their upper extremities. Test results indicated that the C-5 quadriplegic could maintain the best control with the forearm while supported by an arm rest or other similar device which limits effective control motion to a radius of approximately four inches from the neutral point. In addition, motions across the central line of the body, (such as those needed to turn a conventional steering wheel) were found to be especially difficult to control. A control resistance of two pounds maximum was found, however, to be easily achieved and offered good control "feel" to the driver.

The design of the control system of this invention was influenced by the need for a compact system which could be readily installed in a wide range of vehicles and readily removed for service or reinstallation in another vehicle. This goal was realized through the use of actuators powered by electric motors and installed entirely within the passenger compartment of the vehicle. Two linear actuators are used to operate the accelerator and brake pedal while a rotary actuator is used to turn the steering wheel. While three actuators are shown and described herein, it is to be realized that actuators could be combined in function and could be of different types than shown and described herein without departing from the intended scope of the invention.

Installation of the actuators is accomplished by replacing the stock steering wheel with a modified wheel, bolting a drive package under the dashboard and connecting the brake and throttle actuators to the respective pedal. Such installation can be accomplished in a single day by an average experienced mechanic.

The electronics were designed in response to the requirement for a flexible, compact and reliable means of translating the input commands of the operator into the control signals which govern the actuator package. While an analog system is shown herein, it is to be realized that digital electronics could be utilized without departing from the intended scope of the invention.

As shown in FIG. 1, the driver's control input device is a joystick 23 (preferably of aerospace quality) conventionally mounted for pivotal movement on a support structure 34 (which support structure can be a closed receptacle having all or part of the interfacing electronics therein) that is fully adjustable with respect to height, tilt and rotation. The support structure preferably includes an arm rest 36 extending rearwardly therefrom for full support of the driver's hand and arm. This arm rest provides a frame of reference while driving and also isolates the controlling hand from road shocks which might result in an undesired control input. Because the control system is a "fly by wire" type of control (such as is commonly used in high speed aircraft, helicopters and spacecraft), the joystick and support structure can be located anywhere within the passenger compartment where there is enough visibility to drive (realizing, however, that the gear shift and secondary controls would have to be relocated for a driver seated anywhere but the normal driver seat).

In operation, pivoting stick 23 forwardly from a normally centered position depresses the accelerator (or throttle) pedal 17, pivoting stick 23 rearwardly from the normally centered position depresses the brake pedal 18, while left and right pivotal movements from the normally centered position turn the steering wheel 19 in the appropriate direction (i.e., left if pivoted to the left, and right if pivoted to the right). In this manner, all primary control functions are accomplished with a single control stick. If desired, the control exerted by pivoting stick 23 can be changed so that, for example, pivoting stick 23 forwardly depresses brake pedal 18 and pivoting stick 23 rearwardly depresses accelerator pedal 17.

Figure 2:
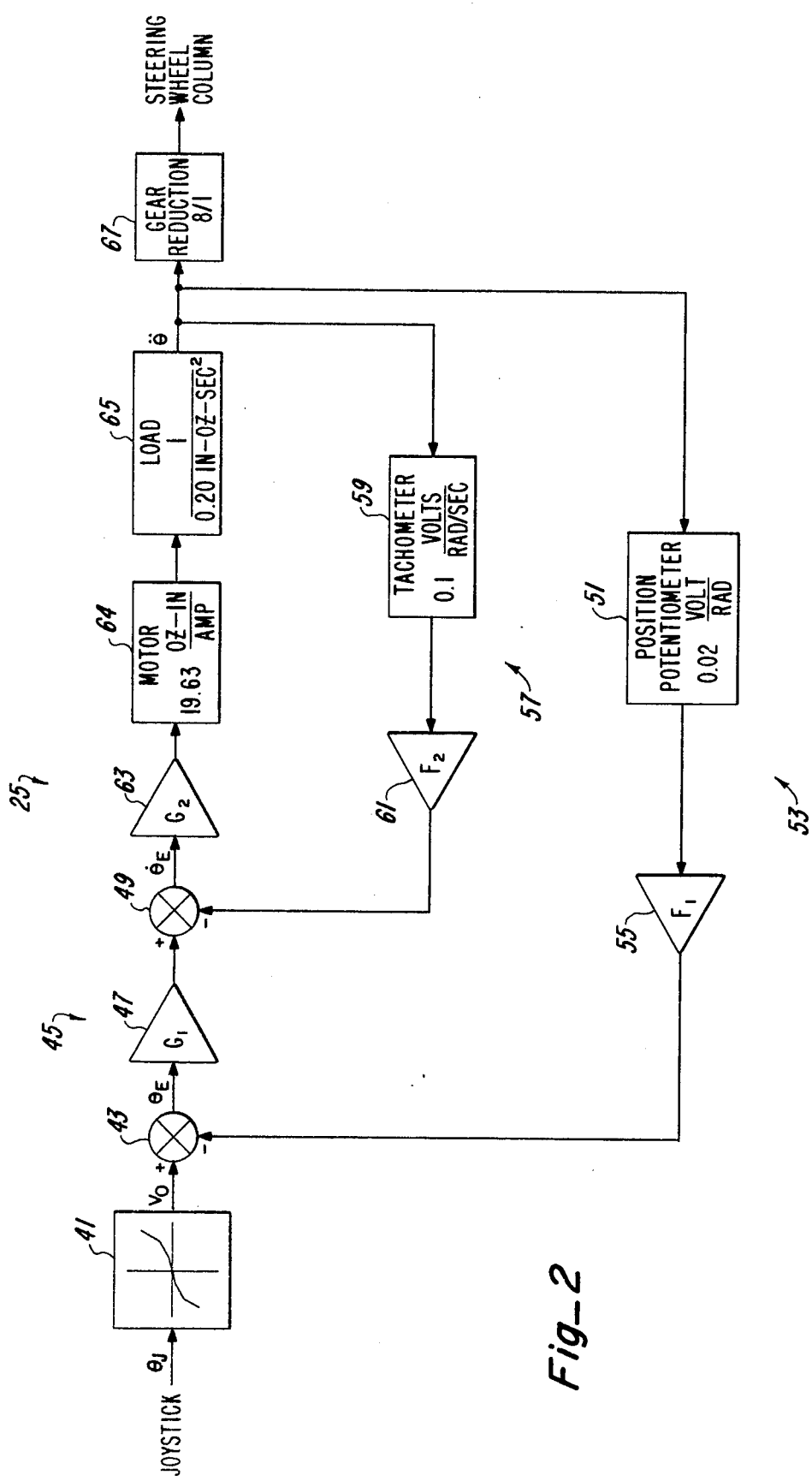
FIG. 2 is a dynamic block diagram of steering control electronics utilized in the control system shown in FIG. 1.

Interfacing electronics 25 (steering) and 27 (throttle/brake) provided between joystick 23 and the electromechanical actuators are shown in block and schematic form in FIGS. 2 and 3 (steering) and 4 and 5 (throttle/brake). Interfacing electronics 25 can be within support structure 34 or can be partially or entirely mounted in a separate box (not shown) mounted in a convenient location (such as under the dashboard) within the vehicle. As indicated in FIG. 1, the electrical connection between the interfacing electronics and the motors is through electrical cable 37, which cable is of a length to allow movement of joystick 23 to any convenient location within the vehicle. If the electronics are located in a separate box, then cable 37 would, of course, extend to the separate box.

The displacement angle $\theta_J$ of joystick 23 is translated via potentiometer 39 (shown in FIG. 3) into an analog voltage. This voltage is received by signal conditioning electronics 41 which in effect changes the linear output of the joystick potentiometer into a nonlinear curve. Thus, joystick 23, potentiometer 39 and signal conditioning electronics 41 form a command segment of the device. The output $V_o$ is received by summing junction 43 of servo-loop electronics 45 (which also includes amplifier 47 and summing junction 49).

At summing junction 43, servo loop electronics 43 compares the commanded voltage $V_o$ to the actual position voltage as sensed by position potentiometer 51 in position feedback loop 53 (which loop also includes amplifier 55). An error voltage $\theta_E$ is generated that increases with an increased error between the command and actual positions.

Error voltage $\theta_E$ is coupled through amplifier 47 to summing junction 49, which receives a second input from velocity feedback loop 57, which loop provides maximum stablity in this high gain system. Velocity feedback loop 57 senses the first derivative, or velocity, of the system utilizing tachometer 59 the output of which is coupled through amplifier 61 to summing junction 49, where an error voltage $\theta_E$ is generated by comparing the command rate of change to the actual rate of change as sensed by the tachometer. The output from summing junction 49 is coupled to power amplifier electronics 63.

Power amplifier electronics 63 converts the voltage from the servo-loop into current (amps) to drive steering motor 64. The approximate relationship is one volt converts into two amps. The amps are converted into torque within the servo motor by motor torque constant $K_T$. The output torque of the motor is coupled through the load of the mechanism power train 65 to the steering column through gear reduction train 67. An eight-to-one gear ratio matches load inertia to motor inertia and optimizes the speed-torque relationships.

The selector joystick control is capable of 60° of displacement while a typical steering wheel turns five times from lock to lock. If a strictly linear relationship were maintained between joystick displacement and steering wheel rotation, each degree of stick displacement would result in 30° of wheel rotation, but such a system would be too sensitive for effective vehicle control, and particularly for control by handicapped drivers. For this reason, a nonlinear response curve was developed which provides variable sensitivity in the steering response. The sensitivity is decreased around control neutral and increases as the control stick is moved toward full displacement.

The curve is generated by a circuit realization of the following equation:

$$V_o = n_1 |V_1| V_1$$

where $V_o$ is the output, or actual, response of the steering wheel, $V_1$ is the input, or control stick, displacement, and $n_1$ is a constant to match full displacement of the control stick to a complete turn of the wheel. In this system, an analog voltage multiplier multiplies $V_1$ times the absolute value of $V_1$, resulting in an output which is the square of the input, in the first and third quadrants.

The schematic diagram for the steering interfacing electronics 25 is shown in FIG. 3. As shown, potentiometer 39 of joystick 23 is connected between the +8 and −8 volt power sources through resistors 70 and 71, respectively. The movable wiper of potentiometer 39 is connected to the positive input of operational amplifier 73 of signal conditioning electronics 41. Pin 8 of operational amplifier 73 is connected with ground through capacitor 75 and the output of operational amplifier 73 is fed back to the negative input, with the output also being coupled through resistor 77 to the negative input of operational amplifier 79.

The output of operational amplifier 79 is connected with oppositely poled diodes 81 and 83, with diode 81 being connected with the negative input of operational amplifier 79 through resistor 85, while diode 83 is connected with the negative input of operational amplifier 79 through resistor 87 and is connected with the negative input of operational amplifier 89 through resistor 91. The negative input of operational amplifier 89 is connected with the output through resistor 93 and with the output of operational amplifier 73 through resistor 95.

The output of operational amplifier 89 is connected through potentiometer 97 (one end of which is connected with ground through resistor 99) to the Y input of multiplier 101 (which receives an X input from the output of operational amplifier 73).

Pin 2 of multiplier 101 ($X_{05}$) is connected with the junction of resistors 103 and 105 (forming a voltage divider between the +8 and −8 volt power sources), pin 5 ($Y_{05}$) is connected to the junction of resistors 107 and 109 (forming a voltage divider between the +8 and −8 volt power sources), and pin 4 ($Z_{05}$) is connected with the movable wiper of potentiometer 111 (connected at opposite ends to the +8 and −8 volt power sources.

The $V_o$ and $Z_o$ outputs from multiplier unit 101 are commonly coupled through resistor 113 to the negative input of operational amplifier 115. Pin 8 of operational amplifier 115 is connected with ground through capacitor 117 and the positive input of operational amplifier 115 is connected with ground through resistor 119. The output of operational amplifier 115 is fed back to the negative input through variable resistor 121 which is the high gain control of the device.

The output from operational amplifier 115 is coupled through resistor 123 to the negative input of operational amplifier 125. The positive input of operational amplifier 125 is connected with ground through resistor 127 and the output is fed back to the negative input through variable resistor 129. The output from operational amplifier 125 is coupled through resistor 131 to the positive input of operational amplifier 43 serving as a summing junction. Pin 8 of operational amplifier 43 is connected with ground through capacitor 133, the positive input is connected with ground through resistor 135, and the output is fed back to the negative input through resistor 137.

The movable wiper of potentiometer 139 of position potentiometer unit 51 (controlled by an output from load 65 as indicated in FIG. 3) is connected with the positive input of operational amplifier 55. Potentiometer 139 is connected in series with and between variable resistor 141 (serving as zero adjust) and resistor 143, with resistor 141 being connected to the +8 volt power supply and resistor 143 being connected to the −8 volt power supply. Pin 8 of operational amplifier 55 is connected with ground through capacitor 145 and the output is directly fed back to the negative input. The output of operational amplifier 55 is coupled through resistor 147 to the negative input of operational amplifier 43 serving as a summing junction.

The output from operational amplifier 43 is coupled to the positive input of operational amplifier 47. Pin 8 of operational amplifier 47 is connected with ground through capacitor 149 and the output is fed back to the negative input through resistor 151, with the negative input also being connected with ground through resistor 153.

The output from operational amplifier 47 is coupled through resistor 155 to the positive input of operational amplifier 49 serving as a summing junction. Pins 3 and 8 of operational amplifier 49 are connected with ground through resistor 156 and capacitor 157, respectively, and the output is fed back to the negative input through parallel connected resistor 159 and capacitor 161.

Tachometer 59 (receiving an output from load 65 as indicated in FIG. 3) is connected with the positive input of operational amplifier 61. Pin 8 of operational amplifier 61 is connected with ground through capacitor 163 and the output is directly fed back to the negative input. The output from operational amplifier 61 is coupled through resistor 165 to the negative input of operational amplifier 49 serving as a summing junction.

Thus, the output control voltage of the steering potentiometer is sensed and fed to the signal conditioning electronics to provide a commanded performance signal which is compared with an actual performance signal (as measured by the feedback potentiometer and tachometer) with the difference being an error signal that is used to correct the actual performance by providing the current necessary to drive the servomotors.

A dynamic block diagram for throttle and brake operation is shown in FIG. 4. The operation is similar to that described for steering in connection with FIGS. 2 and 3 with changes being made in the servo-loop gains to optimize performance. For throttle and brake operation, the output voltage of the joystick potentiometer 168 (shown in FIG. 5) is received by zero crossing circuitry in signal conditioning circuitry 170 to switch control between throttle and brake as the control stick 23 passes through the neutral position. Signal conditioning circuitry 170 provides an output to servo-loop electronics 172 (which includes summing junction 174, amplifier 176 and summing junction 178 as indicated in FIG. 4). Servo-loop electronics 172 compares commanded performance and actual performance with actual performance inputs being coupled to summing junction 174 from position feedback loop 180 (which includes position potentiometer 182 and amplifier 184, to provide an error signal $\theta_E$, and to summing junction 178 from velocity feedback loop 186 (which includes tachometer 188 and amplifier 190) to provide an error signal $\dot{\theta}_E$ for automatic correction, which error signal $\dot{\theta}_E$ is coupled through power amplifier 192 to motor 194 (designated in FIGS. 9 and 10 more specifically as throttle motor 194' and brake motor 194"). The output from motor 194 is coupled through mechanical power train load 196 (which provides inputs to position potentiometer 182 and tachometer 188) to drive circuitry 198 to provide actuating current for the brake and throttle actuators.

A schematic diagram of the brake and throttle electronics is shown in FIG. 5. As shown, the movable wiper of potentiometer 168 of joystick 23 is connected with the positive input of operational amplifier 200 of signal conditioning circuitry 170, with the potentiometer being connected with the +8 and −8 volt power supplies through switches 201 and 202 of brake forward-reverse switching unit 203. Pin 8 of operational amplifier 200 is connected with ground through capacitor 205 and the output of operational amplifier 200 is directly fed back to the input.

The output from operational amplifier 200 is coupled through resistor 207 to the negative input of operational amplifier 209. Pin 8 of operational amplifier 209 is connected with ground through capacitor 211, the positive input is connected with ground through resistor 213, and the output is fed back to the negative input through resistor 215.

The output from operational amplifier 207 is coupled to the movable poles 217 and 218 of integrated circuits 220 and 221, respectively, serving as switching units, with the movable poles of switches 223 and 224 of switching units 220 and 221 being connected with ground. Pins 12 of integrated circuits 220 and 221 are connected with the +8 volt power supply while pin 8 is connected with +8 volt power supply through resistors 226 and 227, respectively.

The output from operational amplifier 200 is also coupled through resistor 229 to the positive input of operational amplifier 231, with the negative input of operational amplifier 231 being connected with ground. The output from operational amplifier 231 is fed back to the positive input through resistor 233 and is connected with the +8 volt power supply through resistor 235.

The output from operational amplifier 231 is used to control th positioning of the movable poles of switching units 220 and 221, with the output to control pole 217 being coupled through NOT gates 237 and 238 and the output to contro poles 218 and 223 being coupled through NOT gate 240.

The fixed poles of switching unit 221 are connected through resistor 242 to the positive input of operational amplifier 174A serving as a summing junction of the throttle servo 244. The positive input of operational amplifier 174A is also connected with ground through resistor 246 and pin 8 is connected with ground through capacitor 248, with the output being fed back to the negative input through resistor 250.

Positioning potentiometer 182A is connected in series with resistors 252 and 254 between the +8 and −8 volt power supplies with the movable wiper being connected with the positive input of operational amplifier 184A. Pin 8 of operational amplifier 184A is connected with ground through capacitor 256 and the output is directly fed back to the negative input. The output from operational amplifier 184A is coupled through resistor 258 to the negative input of integrated operational amplifier 174A serving as the summing junction.

The output from operational amplifier 174A (which also serves as amplifier 176 as shown in FIG. 4) is coupled through resistor 260 to the positive input of operational amplifier 178A which also serves as a summing junction. Pin 8 of operational amplifier 178A is connected with ground through capacitor 262 and positive input is connected with ground through resistor 264.

The output from tachometer 188A is coupled to the positive input of operational amplifier 190A which has pin 8 connected with ground through capacitor 266 and the output directly fed back to the negative input. The output of operational amplifier 190A is coupled through resistor 268 to the negative input of operational amplifier 178A serving as the summing junction. The output from operational amplifier 178A is fed back to the negative input through parallel connected resistor 270 and capacitor 272, with the output also being coupled to power amplifier 192.

The fixed poles of switching unit 220 are connected through resistor 275 to the positive output of operational amplifier 174B serving as the summing junction of the brake 277. The positive input of operational amplifier 174B is also connected with ground through resistor 279 and pin 8 is connected with the ground through capacitor 281, with the output being fed back to the negative input through resistor 283.

Position potentiometer 182B is connected in series with resistors 285 and 287 between the −8 and +8 volt power supplies with the movable wiper being connected with the positive input of operational amplifier 184B. Pin 8 of operational amplifier 184B is connected with ground through capacitor 289 and the output is directly fed back to the negative input. The output from operational amplifier 184B is coupled through resistor 291 to the negative input of operational amplifier 174B serving as the summing junction.

The output from operational amplifier 174B (which also serves as amplifier 176 as shown in FIG. 4) is connected through resistor 293 to the positive input of operational amplifier 178B which also serves as the summing junction. Pin 8 of operational amplifier 178B is connected with ground through capacitor 295 and the positive input is connected with ground through resistor 297.

The output from tachometer 188B is coupled to the positive input of operational amplifier 190B which has pin 8 connected with ground through capacitor 299 and the output directly fed back to the negative input. The output of operational amplifier 190B is coupled through resistor 301 to the negative input of operational amplifier 178B serving as the summing junction. The output of operational amplifier 178B is fed back to the negative input through parallel connected resistor 303 and capacitor 305, with the output also being coupled to power amplifier 192.

Three high performance permanent magnet DC actuator motors 64, 194' and 194" are used, which motors are connected with actuators for rotating steering wheel 19, operating the accelerator pedal 17, and operating brake pedal 18, respectively. As shown in FIGS. 6 through 8, rotary steering motor 64 is coupled to steering shaft 308 through gear train 310 which offers adequate mechanical advantage to turn the steering wheel in the event of failure of the steering power assist.

Gear train 310 includes drive gear 312 (connected with motor 64 through flex coupling 314) which drives gear 316 (fixed to steering shaft 308 by means of cap screws 317). As indicated in FIG. 6, bearing plates 318 and 320 and preferably utilized adjacent to drive gear 312 and a third bearing plate 322 is preferably mounted on column bracket 324. Steering wheel hub 326 (having wheel spoke 327 extending therefrom) is mounted at the end of steering shaft 308 by nut 328 with a bearing 330 being utilized between wheel hub 326 and bearing plate 320.

Steering motor 64 is mounted on the outer tube 332 of the steering column by bracket 334 and mounting plate 336 so that the motor shaft 338 is connectable with flex coupling 314. As shown best in FIG. 6, tachometer 59 is mounted on motor 64 and position potentiometer 51 is mounted to sense positioning of gear 316 through idling gear 340.

Thus, the only modification required for steering is to remove the standard steering wheel and replace the same with the modified steering shown in FIGS. 6 through 8 (the steering wheel can be left for normal operation when the control system shown herein is not being utilized). The position and velocity of the steering wheel are sensed in this invention by use of the position potentiometer and tachometer, respectively, which feed a signal the interfacing electronics as brought out hereinabove.

Accelerator pedal 17 and brake pedal 18 are depressed by independent actuators as shown in FIGS. 1 and 9 through 11. The actuator assemblies are attached to the permanent magnet DC motors 194' (accelerator) and 194" (brake) and include rack and pinion drive mechanisms 344 (accelerator) and 346 (brake), and pedal attachment brackets 348 (accelerator) and 350 (brake).

As shown in FIGS. 9 through 11, accelerator and brake motors 194' and 194" are mounted on the outer tube 332 of the steering column downwardly from the mounting of the steering motor 64 (which is mounted on the outer tube 332 by means of mounting plate 336). Motors 194' and 194" are mounted on the outer tube 332 by a mounting bracket 350 and mounting plates 352 and 354.

As shown in FIG. 9, position feedback potentiometer 182A (brake) and tachometer 188A (accelerator) are mounted adjacent to accelerator rack and pinion mechanism 344, while position feedback potentiometer 182B (brake) and tachometer 188B (brake) are mounted adjacent to brake rack and pinion mechanism 346.

Gear rack 358 extends from brake rack and gear mechanism 346 as shown in FIGS. 9 and 11. As shown, rack 358 extends to position-to-force converter 360 which is a spring loaded compressible link (by means of spring 361) connected at the end to a rod bearing 362 to achieve a smooth and gradual brake application. Rod end bearing 362 is attached for pivotal movement with pedal attachment bracket 350 fixed to the conventional brake pedal arm 364 of brake pedal 18 so that extension of gear rack 358 causes the brake to be applied and retraction of gear rack 358 ceases brake application.

Gear rack 366 extends from accelerator rack and gear mechanism 344, as also shown in FIGS. 9 and 11. As shown, rack 366 extends to position to force converter 368 which is similar to position-to-force converter 360 (but does not include a spring for spring-loading) connected at the end to a rod end bearing 370. Rod end bearing 370 is attached for pivotal movement with pedal attachment bracket 348 fixed to conventional accelerator pedal arm 372 of accelerator pedal 17 so that extension of gear rack 366 increases the throttle setting of the vehicle engine and retraction of gear rack 366 reduces the throttle setting of the vehicle engine.

In operation, the driver controls the vehicle using a convenient single stick in one hand, moving it forward to accelerate, back to brake, and to either side to steer. The stick can be located anywhere in the vehicle (drivers seat, passenger seat, or back seat), and the driver's arm is preferably supported to provide a frame of reference during driving. In a working embodiment, the adapted vehicle was found to be easy to drive with little training required, driving being with one hand and supported arm which proved to reduce fatigue and sudden perturbations caused by road bumps or dips. If a failure should occur, the vehicle is preferably caused to steer straight ahead and come to a safe stop by virtue of the emergency brake (as a backup system).

The control system of this invention provides an improved control system that can be effectively used by both handicapped and non-handicapped individuals, with the control system allowing more severely handicapped individuals to drive motor vehicles (people with spinal injuries in the C-5 region, for example). In addition, the control system of this invention requires very little driver training, is easier to drive for able-bodied people with less fatigue than using both hands and both legs as is necessary with a conventional system, is relatively easier to install, is relatively inexpensive, allows an individual to drive with primary controls from any position (drivers seat, passenger seat or back seat), allows full use of normal controls (steering wheel, brake pedal, and throttle pedal) as backup by an able-bodied person or garage mechanic when desired, includes a remote manipulator for performing all primary driving functions in a standard motor vehicle, and enables all modifications to be made within the passenger compartment (not in the engine compartment or under the vehicle).

What is claimed is:

1. A control system for a motor vehicle having a rotary steering mechanism, a throttle mechanism, and a brake mechanism, said control system comprising:
   command means having a first portion displaceable in at least four different directions, and a second portion responsive to displacement of said first portion in different ones of said directions providing electrical signals indicative of commanded changes in the direction and speed of said vehicle;
   electrically responsive means including a rotary actuator for causing rotation of said steering mechanism and linear actuators, including rack and pinion mechanisms, for actuating said throttle and brake mechanisms; and
   signal processing means connected with said second portion of said command means and said electrically responsive
   means, said signal processing means, responsive to received electrical signals indicative of commanded changes in vehicle direction, causing said electrically responsive means to effect rotation of said steering mechanism, and responsive to received electrical signals indicative of commanded changes in vehicle speed, causing said electrically responsive means to effect actuation of at least one of said throttle and brake mechanisms.

2. The control system of claim 1 wherein said first portion of said command means includes a joystick displaceable in opposite directions along two different axes.

3. The control system of claim 2 wherein said joystick has a limited range of motion and wherein said control system includes arm positioning means for positioning the arm of a driver manipulating said joystick.

4. The control system of claim 1 wherein said second portion of said command means includes potentiometers, the movable wipers of which are controlled by the positioning of said first portion of said command means.

5. The control system of claim 1 wherein said electrically responsive means are electro-mechanical actuators.

6. The control system of claim 1 wherein said system includes means for mounting said command means, electrically responsive means, and said signal processing means within said vehicle adjacent to an operator.

7. A control system for a motor vehicle having a rotary steering mechanism, a throttle mechanism, and a brake mechanism, said control system comprising:

command means having a first portion displaceable in at least four different directions, and a second portion responsive to displacement of said first portion in different ones of said directions providing electrical signals indicative of commanded changes in the direction and speed of said vehicle;

electrically responsive means including a rotary actuator for causing rotation of said steering mechanism and linear actuators for actuating said throttle and brake mechanisms; and signal processing means connected with said second portion of said command means and said electrically responsive means, said signal processing means, responsive to received electrical signals indicative of commanded changes in vehicle direction, causing said electrically responsive means to effect rotation of said steering mechanism, and responsive to receive electrical signals indicative of commanded changes in vehicle speed, causing said electrically responsive means to effect actuation of at least one of said throttle and brake mechanisms, said signal processing means including first means for providing a signal indicative of commanded position, second means for providing a signal indicative of actual position, and error signal producing means for receiving signals from said first and second means and producing an error signal for driving said electrically responsive means to said commanded position.

8. The control system of claim 7 wherein said second means includes velocity and position feedback loops.

9. The control system of claim 8 wherein said velocity feedback loop includes a tachometer and said position feedback loop includes a position potentiometer.

10. A control system for a motor vehicle having a rotatable steering mechanism, a throttle pedal, and a brake pedal mounted for access within the vehicle at a driver station, said control system comprising:

command means within said vehicle for providing electrical signals indicative of desired changes in direction and speed of said motor vehicle;

signal processing means within said vehicle connected with said command means to receive said electrical signals therefrom and responsive thereto providing electrical output signals indicative of needed changes in direction and speed to that desired; and electrically responsive actuating means connected with said signal processing means to receive said electrical output signals therefrom said electrically responsive actuating means having one portion connected with said rotatable steering mechanism within said vehicle for rotating said steering mechanism to effect needed changes in direction of said vehicle, and a second portion within said vehicle connected with said throttle pedal and said brake pedal for depressing the same to effect needed changes in the speed of said vehicle.

11. The control system of claim 10 wherein said command means is a two-axis joystick with limited range of motion in opposite directions with said axes being normal to one another.

12. The control system of claim 18 wherein said electrically responsive actuating means includes a rotary actuator and a pair of linear actuators.

13. A control system for a motor vehicle having a rotary steering mechanism, a throttle mechanism, and a brake mechanism, said control system comprising:

a joystick displaceable in opposite directions along two different axes, said joystick having a limited range of motion;

potentiometer means having movable wipers controlled and positioned by said joystick;

command signal developing means connected with said potentiometer means to provide electrical signals indicative of commanded direction and speed of said motor vehicle;

actual signal developing means including tachometer means and position potentiometer means to provide electrical signal indicative of actual direction and speed of said motor vehicle;

signal combining means connected to receive said electrical signals from said command signal developing means and said actual signal developing means responsive thereto providing error output signals;

a rotary actuator connected to receive said error output signals indicative of needed changes in the direction of said motor vehicle and responsive thereto rotating said rotary steering mechanism to effect said direction changes; and linear actuator means connected to receive said error output signals indicative of needed changes in the speed of said motor vehicle and responsive thereto actuating at least one of said throttle mechanism and brake mechanism to effect said speed changes.

14. The control system of claim 13 wherein said actual signal developing means includes a velocity feedback loop including said tachometer means and a position feedback loop including said position potentiometer means.

15. The control system of claim 13 wherein said potentiometer means includes separate potentiometers connected to sense motion of said joystick in each of said axes and directions of movement, wherein said electrical signals indicative of command direction and speed are separate signals developed for each, wherein said actual signal developing means develop separate electrical signals for direction and speed, and wherein said electrical signals indicative of direction and speed are separately combined for providing direction error signals and speed error signals.

16. The control system of claim 13 wherein said linear actuating means includes rack and pinion mechanisms, and wherein said rack and pinion mechanisms are connected with said throttle and brake mechanisms through position-to-force converters.

17. The control system of claim 16 wherein said position-to-force converter connecting said rack and pinion mechanism through said brake mechanism includes a spring for spring loading of said converter.

* * * * *